United States Patent
Mishra et al.

(10) Patent No.: US 7,818,272 B1
(45) Date of Patent: Oct. 19, 2010

(54) METHOD FOR DISCOVERY OF CLUSTERS OF OBJECTS IN AN ARBITRARY UNDIRECTED GRAPH USING A DIFFERENCE BETWEEN A FRACTION OF INTERNAL CONNECTIONS AND MAXIMUM FRACTION OF CONNECTIONS BY AN OUTSIDE OBJECT

(75) Inventors: Nina Mishra, Charlottesville, VA (US); Robert Samuel Schreiber, Palo Alto, CA (US); Robert E. Tarjan, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1115 days.

(21) Appl. No.: 11/496,807

(22) Filed: Jul. 31, 2006

(51) Int. Cl.
*G06F 15/18* (2006.01)

(52) U.S. Cl. ........................................ 706/14

(58) Field of Classification Search .................. 706/14; 463/29; 380/251; 707/713, 721, 776, 706–709
See application file for complete search history.

(56) References Cited

U.S. PATENT DOCUMENTS

| | | | |
|---|---|---|---|
| 7,548,915 | B2 * | 6/2009 | Ramer et al. ................. 1/1 |
| 2006/0122998 | A1 * | 6/2006 | Bar-Yossef et al. ............ 707/5 |
| 2006/0190225 | A1 * | 8/2006 | Brand ............................. 703/2 |

OTHER PUBLICATIONS

Brand, A Random Walks Perspective on Maximizing Satisfaction and Profit, 2005, Mitsubishi, pp. 1-10.*

* cited by examiner

*Primary Examiner*—David R Vincent

(57) ABSTRACT

A method for discovery of a cluster of objects in an arbitrary undirected graph. A subset of the objects is determined by performing a random walk starting from a first object of the objects and following a plurality of random edges of subsequent objects, the subset comprising the first object and the subsequent objects. An enlarged subset is determined by enlarging the subset to include other objects well-connected to the subset. It is determined whether the enlarged subset is a cluster.

20 Claims, 3 Drawing Sheets

METHOD FOR DISCOVERY OF CLUSTERS OF OBJECTS IN AN ARBITRARY UNDIRECTED GRAPH USING A DIFFERENCE BETWEEN A FRACTION OF INTERNAL CONNECTIONS AND MAXIMUM FRACTION OF CONNECTIONS BY AN OUTSIDE OBJECT

BACKGROUND ART

As the usage of computers continues to proliferate, the collection of large amounts of data also grows. For example, through social (e.g., telephone, email, web browsing) and economic (e.g., shopping, stocks, bank transactions) activities, enormous datasets are generated that potentially contain latent information of significance to economics, sociology, business, and national security. The World-Wide-Web is an example of the kind of dataset whose very existence creates significant business opportunities.

The analysis of very large datasets is becoming a central problem in computing. Storage and analysis of large datasets drives a big and growing segment of the computer hardware industry. In order to analyze large datasets, the data is often arranged in very large graphs. Features of these graphs are isolated. For example, clusters of tightly connected vertices that are somewhat isolated from the remainder of the graph may be found. In general, clustering is the problem of grouping similar objects while keeping dissimilar objects apart. Clustering is a fundamental tool for finding useful information latent in very large datasets.

There are many prior solutions that provide ways of clustering in large datasets. However, these prior solutions suffer from various drawbacks. For instance, one could examine every subset of the set of objects and check whether the examined subset is a cluster according to some clustering criteria, but this would be prohibitively expensive except for very small datasets. In particular, for large datasets this could include billions and billions of operations, and is thus far too computationally intensive to be practical. Another prior solution proposes to look at clustering by separating the graph into multiple parts and cutting the edges traversing the parts. This solution does not determine the number of clusters that exist, requiring a user to input the number of clusters desired, thereby potentially distorting the results. Moreover, this solution assumes that every object is in exactly one cluster, which may not be a reasonable assumption because some objects may be in multiple clusters and some objects may not be in any cluster. Yet another solution considers only the denseness of internal connectivity of an identified cluster without considering the sparseness of external connectivity, thereby unnecessarily and potentially detrimentally limiting the identification of a cluster.

BRIEF DESCRIPTION OF THE DRAWINGS

The accompanying drawings, which are incorporated in and form a part of this specification, illustrate embodiments of the invention and, together with the description, serve to explain the principles of the invention.

Figure 1:
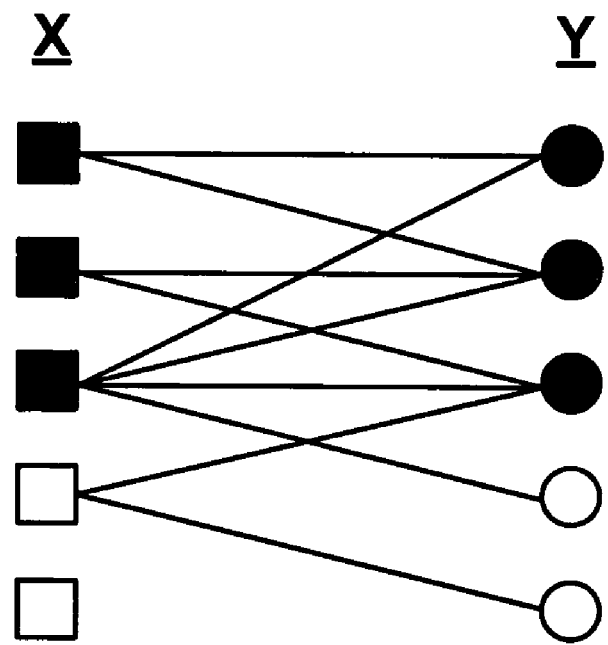
FIG. 1 is a block diagram illustrating an exemplary bipartite graph, in accordance with an embodiment of the present invention.

The drawings referred to in this description should not be understood as being drawn to scale except if specifically noted.

DESCRIPTION OF THE EMBODIMENTS

Various embodiments of the present invention, method for discovery of a cluster of objects in an arbitrary undirected graph, are described herein. A subset of the objects is determined by performing a random walk starting from a first object of the objects and following a plurality of random edges of subsequent objects, the subset comprising the first object and the subsequent objects. An enlarged subset is determined by enlarging the subset to include other objects well-connected to the subset. It is determined whether the enlarged subset is a cluster.

Reference will now be made in detail to the various embodiments of the invention, examples of which are illustrated in the accompanying drawings. While the invention will be described in conjunction with the various embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the various embodiments of the present invention, numerous specific details are set forth in order to provide a thorough understanding of the present invention. In other instances, well known methods, procedures, components, and circuits have not been described in detail as not to unnecessarily obscure aspects of the embodiments of the present invention.

Various embodiments of the present invention provide for discovery of clusters of objects, also referred to herein as vertices, within an arbitrary undirected graph. An undirected graph is a graph in which relations between pairs of objects are symmetric. One example of an undirected graph is a bipartite graph. A bipartite graph is a pair of object sets X and Y and edge set E whose members are pairs, such that every edge has one end-point in X and one end-point in Y. For example, X may be the set of all people and Y the set of all employers, where the ordered pair (x,y) is an edge of the graph if x has ever worked for y.

In general, a cluster is a pair of object subsets for which a large fraction of possible edges are present. For purposes of the present application, a cluster is defined as a subset of objects of a graph for which internal connectivity is high and that is sparsely connected externally. In one embodiment, the internal connectivity and external connectivity are threshold values, wherein a cluster is a subset of objects that exceeds an internal connectivity threshold and is less than an external connectivity threshold. In one embodiment, the internal connectivity threshold and external connectivity threshold are fractions.

In one embodiment, the internal connectivity threshold is beta ($\beta$), where beta is the fraction of internal connection required to define a cluster, and the external connectivity threshold is alpha ($\alpha$), where alpha is the maximum fraction of connections by an outside object to the proposed cluster. In one embodiment, alpha and beta are user defined values that are used in evaluating whether a subset of objects is a cluster. In general, a cluster is defined by a low alpha and a high beta. In other words, a cluster is a group of vertices that are strongly connected to one another and weakly connected to all other vertices.

With reference to FIG. 1, an exemplary bipartite graph 100 in accordance with an embodiment of the present invention is shown. Bipartite graph includes object set X including dark and light squares, object set Y including dark and light circles, and a number of edges connecting an object from X and an object from Y. Bipartite graph 100 illustrates the clustering of objects by showing a cluster as an internally dense but externally sparse graph.

As shown in FIG. 1, the dark squares and dark circles are connected to at least two-thirds of the opposite dark shape and no light shape is connected to more than one third of the opposite dark shape. Accordingly, bipartite graph 100 shows that the dark squares and the dark circles form a ($\frac{1}{3}$, $\frac{2}{3}$) cluster, since all the dark shapes are connected to at least two-thirds of the opposite dark shape and no light shape is connected to more than one-third of the opposite dark shape. In other words, the dark shapes form a cluster where alpha equals one-third and beta equals two-thirds.

Embodiments of the present invention provide for the identification of clusters of objects in a bipartite graph. As described above, a bipartite graph G=(X,Y,E) is a pair of vertex sets X and Y and an edge set E whose members are pairs (x,y), x∈X, y∈Y. A bipartite cluster is a pair of vertex subsets $C \subseteq X$ and $D \subseteq Y$ for which a large fraction of the possible edges are present. Define the measure $$\beta = \beta(C, D) \equiv \frac{|E \cap (C \times D)|}{|C \times D|} \quad (1)$$

of internal connectivity, where |X| denotes the cardinality of the set X, and × is the Cartesian product of sets. In one embodiment, a cluster is a subset for which the internal connectivity exceeds a threshold β.

Moreover, a cluster is a subset for which external connectivity is sparse. β(C,D)=1 for any biclique (C,D), even if not maximal, where a biclique is a type of bipartite graph where every object of the first set is connected to every object of the second set. It may be undesirable to report that (C,D) is a cluster if there is some vertex, e.g., ĉ not in C, that is adjacent to all of D, that is left out of the cluster. An interesting cluster is both well connected internally and sparsely connected externally. In the present embodiment, the external connectivity of (C,D) is defined as $$\alpha = \alpha(C,D) \equiv \max(\alpha_C, \alpha_D) \quad (2)$$

where $$\alpha_C \equiv \max_{d \in Y \setminus D} \phi(d, C), \quad (3)$$

and $$\alpha_D \equiv \max_{c \in Y \setminus D} \phi(c, D), \quad (4)$$

and where, for any vertex p and any vertex set Q, $$\phi(p, Q) \equiv \frac{|adj(p) \cap Q|}{|Q|} \quad (5)$$

is the fraction of Q to which p is adjacent. The gap β(C,D)−α(C,D) measures the extent to which (C,D) stands apart from the remainder of the graph. In one embodiment, a cluster is a vertex subset with a sufficiently large gap. In other embodiments, a minimum size for C and D may be imposed, and β may be required to exceed a threshold value.

It should be appreciated that clusters of a graph as described herein may overlap. In particular, there is no reason to think that objects of interest, such as genes and people, form disjoint clusters. Consider a model bipartite graph, in which X={$x_1, \ldots, x_n$}, Y={$y_1, \ldots, y_n$}, and $x_k$ is adjacent to all $y_j$ for which |j−k|≦2. Every pair (C, D) consisting of a consecutive run of four vertices (from both X and Y) is well connected internally (fourteen out of a possible sixteen edges are present, so β=$\frac{7}{8}$) and sparsely connected externally (no non-cluster vertex in X is adjacent to more than two of the four members of D, and so α=$\frac{1}{2}$). Accordingly, overlap of clusters is allowed by the definition.

Figure 2:
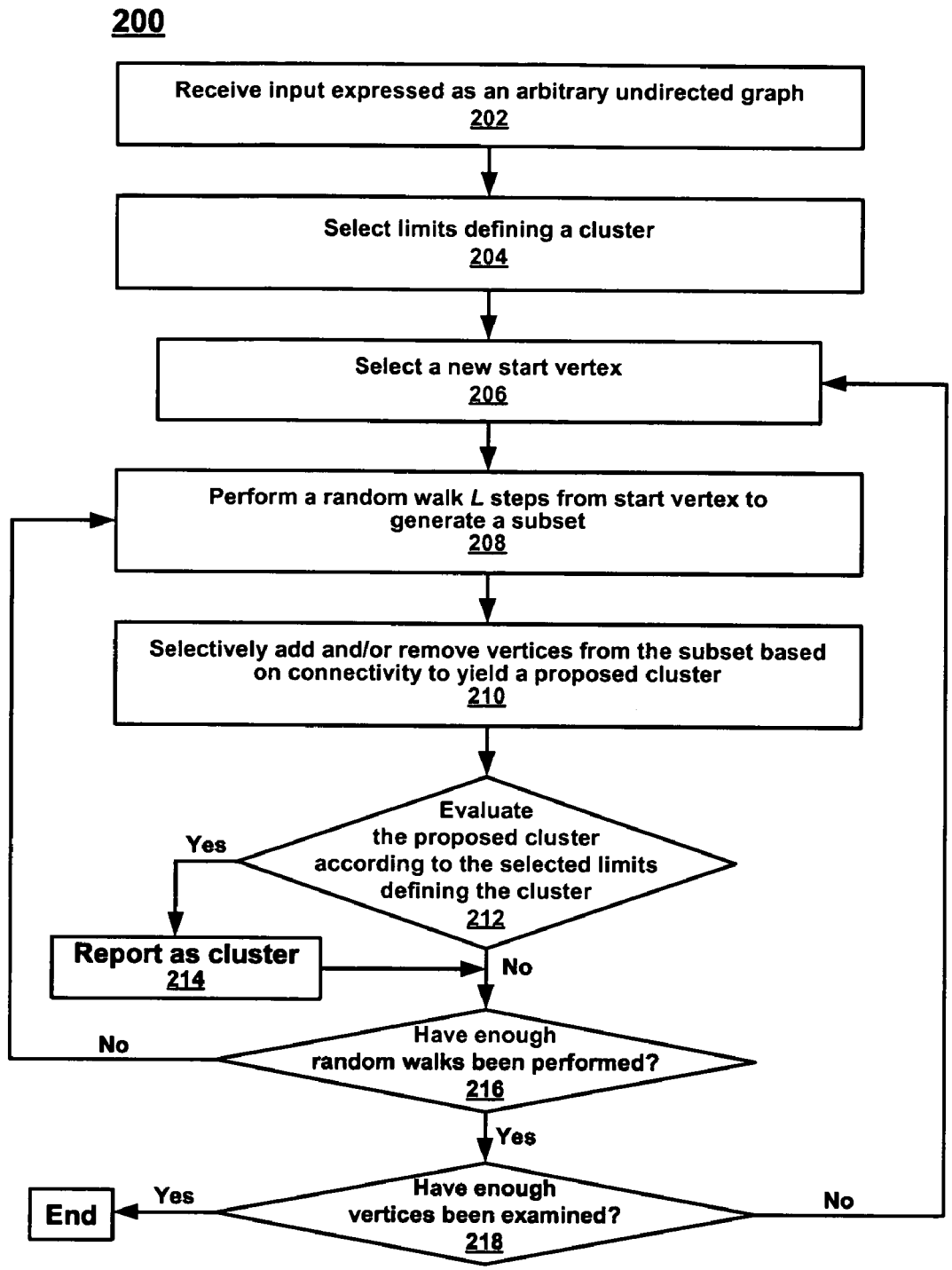
FIG. 2 is a flow chart illustrating a process for discovery of a cluster of objects in an arbitrary undirected graph, in accordance with an embodiment of the present invention.

FIG. 2 is a flow chart illustrating a process 200 for discovery of a cluster of vertices in an arbitrary undirected graph, in accordance with an embodiment of the present invention. In one embodiment, process 200 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. Although specific steps are disclosed in process 200, such steps are exemplary. That is, the embodiments of the present invention are well suited to performing various other steps or variations of the steps recited in FIG. 2. In one embodiment, process 200 is performed by a computer system.

Process 200 attempts to identify a subset of a cluster, also referred to herein as a seed, including a few vertices of C and a few of D, and then to round out the whole cluster by including other vertices to which they are well connected.

At step 202, input expressed as an arbitrary undirected graph is received. In one embodiment, the arbitrary undirected graph is a bipartite graph. In one embodiment, at high-degree vertices are removed from the input graph. In general, high-degree vertices do not contribute much to the cluster structure, and they decrease the likelihood of process 200 to find clusters.

At step 204, limits defining a cluster are selected. In one embodiment, the limits are connectivity fractions alpha and beta as described above, where alpha is the maximum fraction of connections by an outside vertex to the proposed cluster and where beta is the fraction of internal connection required to define a cluster. In one embodiment, alpha and beta are user-defined values.

At step 206, a new start vertex is selected from the input graph. To find seeds, a vertex x of X is taken as a start point.

At step 208, a random walk is performed starting from the start vertex and traversing a number of random edges of subsequent vertices. In one embodiment, the random walk includes a predetermined number of steps. In one embodiment, a random walk of length 2L−1 starting from x is performed, yielding L vertex subsets $C \subseteq X$ and $D \subseteq Y$. In one exemplary embodiment, L=5. Each of the vertices traversed in the random walk, e.g., the start vertex and all subsequent vertices, are included in the subset.

It should be appreciated that the probability of the random walk may be controlled. In one embodiment, the random walk is performed such that the random walk visits the neighbors of the last-visited vertex with uniform probability. In another embodiment, the random walk visits the neighbors of all the previously visited vertices (in C or in D, alternately) with equal probability. In another embodiment, the random walk favors new vertices connected to more of those already selected. For example, the random walk selects each new vertex with probability proportional to the number of neighbors among those already visited.

Figure 3:
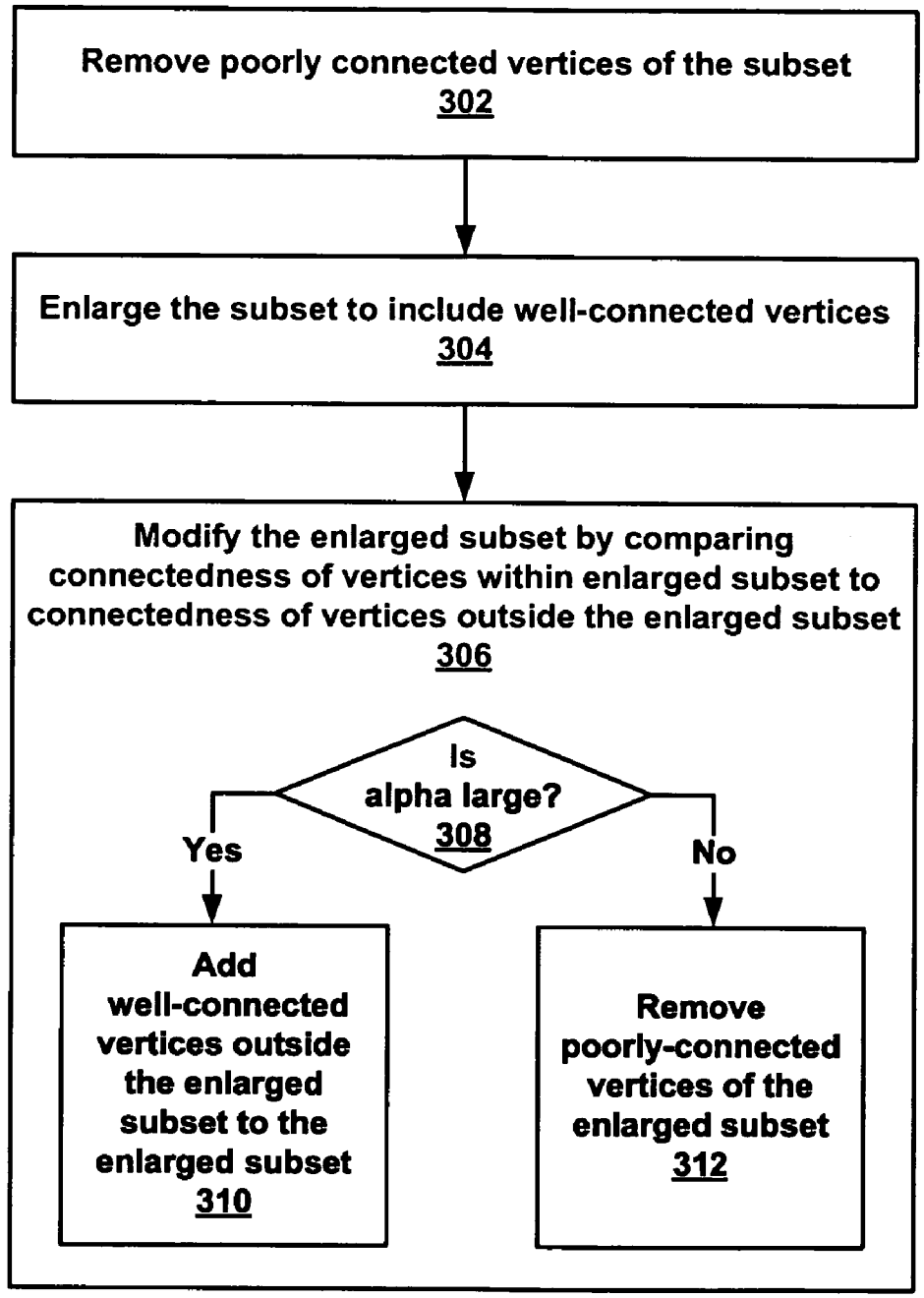
FIG. 3 is a flow chart illustrating a process of selectively adding and removing objects from a subset, in accordance with an embodiment of the present invention.

At step 210, vertices are selectively added and/or removed from the subset based on their connectivity, yielding a proposed cluster. FIG. 3 is a flow chart illustrating a process 300 of selectively adding and removing vertices from a subset, in accordance with an embodiment of the present invention. It should be appreciated that step 210 may be performed according to process 300. It should further be appreciated that step 210 may include any combination of the steps of process 300.

At step 302 of process 300, poorly connected vertices of the subset are removed. It should be appreciated that a cluster in accordance with the described embodiments does not preclude membership by a vertex that has any non-cluster neighbors. When such a vertex is visited in the random walk, non-cluster vertices are quite likely to be visited as well. In one embodiment, poorly connected vertices are removed from the seed following the random walk but before any expansion.

In one embodiment, the resulting subset (C,D) is examined to find the number of neighbors in D for each element in C, and vice versa. Vertices are removed from subset (C,D) that have fewer than a threshold number of neighbors. In one embodiment, the threshold is half the largest number of neighbors that any element has. However, it should be appreciated that any threshold value may be used. In one embodiment, the subset yielded by the random walk includes vertices that have at least $d_{min}$ neighbors in the walk, where for vertices in C, $$d_{min}=(\tfrac{1}{2})\max_{c\in C}|\text{adj}(c)\cap D| \qquad (6)$$

and similarly for those in D. It should be appreciated that step 302 is optional.

At step 304, the subset is enlarged to include well-connected vertices of the graph that are not already included in the subset. In one embodiment, $\phi_\rho(C)$ is defined as the subset of Y consisting of vertices y connected to a $\rho$ fraction of C, $$\phi_\rho(C)=\{y\in Y|\phi(y,C)\geq\rho\} \qquad (7)$$

and $\phi_\rho(D)$ is defined in like manner. The enlargement includes performing Equations (1), (3), (4) followed by:

$$\rho=R(\alpha_C,\beta), \qquad (8)$$

$$D\leftarrow D\cup\theta_\rho(C), \qquad (9)$$

$$\rho=R(\alpha_D,\beta), \qquad (10)$$

and $$C\leftarrow C\cup\theta_\rho(D) \qquad (11)$$

In one embodiment, equations (1), (3), (4) and (8) through (11) are repeated until there is no change to C or D.

It should be appreciated that the threshold parameter adapts to the current values of $\alpha$ and $\beta$ so as to bring in additional well connected vertices:

$$R(\alpha,\beta)=\max(\alpha,\tfrac{2}{3}\beta) \qquad (12)$$

At step 306, the enlarged subset is modified by comparing the connectedness of vertices within the enlarged subset to the connectedness of vertices outside of the large subset. This comparison effectively enforces a fairness criterion. If an in-cluster vertex is less well-connected to the cluster than an out-of-cluster vertex, this is a violation of fairness. Consider an in-cluster vertex $c_{in}$ that is in C, and that has $k_{in}$ neighbors in D, while some non-cluster vertex $c_{out}$ has $k_{out}$ neighbors in D, and $k_{out}>k_{in}$.

At step 308, $\alpha$ and $\beta$ are compared. If $\alpha$ is large relative to $\beta$ (e.g., at least $0.8\beta$), as shown at step 310, well-connected vertices outside the enlarged subset are added to the enlarged subset. In other words, $c_{out}$ and all other vertices not yet in C having $k_{out}$ neighbors in D are included in the enlarged subset. If $\alpha$ is not large relative to $\beta$, poorly-connected vertices of the enlarged subset are removed. In other words, $c_{in}$ and all other vertices in C having only $k_{in}$ neighbors in D are removed. It should be appreciated that steps 310 and 312 are continued until all excluded vertices have smaller internal connectivity than every internal vertex.

Moreover, it should be appreciated that either step 310 or step 312 will reduce the difference between the maximum internal degree of an excluded vertex and the minimum internal degree of an included vertex. It should also be appreciated that steps 308, 310 and 312 are optional.

With reference to FIG. 2, at step 212, the proposed cluster (e.g., the enlarged subset) is evaluated to determine whether it is a cluster. The quality of the proposed cluster (C,D) is evaluated and the decision as to either accept or reject it as a cluster is made. In one embodiment, the proposed cluster is evaluated according to the selected limits defining the cluster selected at step 204 above. Other limits that may be used include a minimum gap between $\alpha$ and $\beta$, minimum sizes for C and D, a minimum value of $\beta$, or other restrictions.

In one embodiment, C and D are examined and their neighbors in the full sets X and Y are found. With these four sets (C,D, the neighbors of D not in C, the neighbors of C not in D) the connectivity fractions $\alpha$ and $\beta$ of this potential cluster are calculated. If the gap ($\beta-\alpha$) is larger than a threshold value, the proposed cluster is determined to be a cluster interesting enough to report. If the proposed cluster satisfies the limits defining a cluster, the proposed cluster is reported as a cluster, as shown at step 214. Process 200 then proceeds to step 216. Alternatively, if the proposed cluster does not satisfy the limits defining a cluster, process 200 then proceeds directly to step 216.

At step 216, it is determined whether enough random walks for the selected vertex have been performed. Since the random walk is randomized, the random walk may or may not find one of the clusters to which the start vertex belongs. In one embodiment, several random walks from each start vertex are performed in order to ensure that the start vertex is included in a cluster if appropriate. In one exemplary embodiment, twenty random walks are performed for each start vertex. However, it should be appreciated that any number of random walks may be performed.

If it is determined that not enough random walks have been performed for the start vertex, process 200 proceeds to step 208. Alternatively, if enough random walks have been performed, process 200 proceeds to step 218.

At step 218, it is determined whether enough vertices of the graph have been examined. In one embodiment, every vertex of the graph is examined. In another embodiment, a selected number of vertices of the graph are examined. In another embodiment, a random number of vertices of the graph are examined. It should be appreciated that any number of vertices may be examined, although in general the more vertices examined the better the identification of clusters. If it is determined that not enough vertices have been examined, process 200 proceeds to step 206, wherein a new start vertex is selected. Alternatively, if enough vertices have been examined, process 200 ends.

In one embodiment, an iterative improvement is performed, using the gap between $\alpha$ and $\beta$ as an objective function. From a given cluster, a small fixed-length sequence is examined, where each sequence is obtained from the previous one by adding to the cluster a vertex which is a maximizer of $\alpha$. In one exemplary embodiment, the sequence length is six. The best of these is taken, where the maximum gap determines best, as the next configuration. The iterative improvement is stopped when the initial cluster is the best.

It should be appreciated that the runtime of process 200 can be bounded in terms of several process, graph, and cluster characteristics. For example, let $\Delta$ be the maximum degree of a vertex (after removal of high-degree vertices, if any.) Let M be the largest cluster subset C or D. A fixed number of random walks of length L are taken, starting from each member of X. At each step of the random walk there are at most $L\Delta$ adjacent vertices that might be visited next, so the cost of generating a walk is proportional to $L^2\Delta$. At each step of the expansion phase, the neighborhood of the cluster is examined; its size is bounded by $\Delta M$. Let S be the number of expansion steps taken; at most M expansion steps are needed, since the cluster grows monotonically. Thus, the runtime is proportional to $|X|(L^2\Delta+S\Delta M)$.

In summary, in its various embodiments, the present invention provides for discovery of a cluster of objects in an arbitrary undirected graph. In the described embodiments, a seed is determined by performing a random walk traversing edges of neighboring object. Objects are selectively added and/or removed from the seed based on their connectivity to seed, yielding a proposed cluster. The proposed cluster is evaluated based on selected limits defining a cluster.

By defining the $\alpha$, $\beta$ clustering criterion, and the gap $\beta-\alpha$ as a criterion for identifying important bipartite graph features, the described embodiment provides a fast method that is able to find nearly all these clusters in large bipartite graphs in a practical, small amount of time. The method works with a small part of the overall bipartite graph at any one time. Moreover, the described embodiments are amenable to being implemented in parallel on a cluster of machines onto which the graph or relation has been distributed in a way that preserves locality. Furthermore, the described embodiments provide for the identification of clusters that are topically focused.

The clustering method described herein has many potential applications, including:

Product bundles: The vertices in X correspond to one shopping basket and the vertices in Y correspond to products with an edge connecting a product to a shopping basket if the product belonged to that basket. Clusters of similar products can be used for cross-sell and up-sell purposes.

Customer Segments: The vertices in X correspond to information about customers, e.g., demographics, buying patterns, etc., and the vertices in Y correspond to customers. Clusters of customers can now be used for target marketing purposes.

Gene Expressions: The vertices in X correspond to genes and the vertices in Y correspond to experiments, where an edge (x,y) occurs if gene x is expressed in experiment y. Clusters of genes are genes with a similar function.

Various embodiments of the present invention, a method for discovery of a cluster of objects in an arbitrary undirected graph, are described herein. While the present invention has been described in particular embodiments, it should be appreciated that the present invention should not be construed as limited by such embodiments, but rather construed according to the following claims.

What is claimed is:

1. A computer-implemented method for discovery of a cluster of objects in an arbitrary undirected graph, the method comprising:
    determining a subset of the objects by performing a random walk starting from a first object of the objects and following a plurality of random edges of subsequent objects, the subset comprising the first object and the subsequent objects;
    determining an enlarged subset by enlarging the subset to include other objects well-connected to the subset; and
    determining whether the enlarged subset is a cluster wherein fraction of internal connections which defines a cluster ($\beta$) is determined, a maximum fraction of connections by an outside object to said cluster ($\alpha$) is determined, and said cluster is defined as acceptable when the difference between said fraction of internal connections and said maximum fraction of connections by an outside object ($\beta-\alpha$) exceeds a threshold value.

2. The computer-implemented method of claim 1 further comprising removing objects from the subset based on connectivity of objects within the subset.

3. The computer-implemented method of claim 1 further comprising modifying the enlarged subset by comparing connectedness of objects within the enlarged subset to connectedness of objects outside of the enlarged subset to objects within the enlarged subset.

4. The computer-implemented method of claim 3 further comprising adding objects outside of the enlarged subset to the enlarged subset that have higher connectivity to objects within the enlarged subset than a connectivity within the enlarged subset of at least one object within the enlarged subset.

5. The computer-implemented method of claim 3 further comprising removing objects within the enlarged subset that have a lower connectivity to other objects within the enlarged subset than a connectivity of at least one object outside the enlarged subset to objects within the enlarged subset.

6. The computer-implemented method of claim 1 wherein the random edges of the random walk are skewed with probability proportional to a number of edges between previous objects of the random walk and a current object of the random walk.

7. The computer-implemented method of claim 1 wherein the determining whether the enlarged subset is a cluster is based at least in part on a minimum fraction of internal connections and a maximum fraction of external connections defining a cluster.

8. The computer-implemented method of claim 1 wherein the arbitrary undirected graph is a bipartite graph.

9. The computer-implemented method of claim 1 wherein the random walk comprises a predetermined number of steps.

10. The computer-implemented method of claim 1 further comprising repeating the determining a subset of the objects, the determining an enlarged subset, and determining whether the enlarged subset is a cluster for a plurality of objects of the arbitrary undirected graph.

11. A computer-usable storage medium having computer-readable program code embodied therein for causing a computer system to perform a method for discovery of clusters of vertices in an arbitrary undirected graph, the method comprising:
    for a plurality of vertices of the arbitrary undirected graph
        performing a random walk starting from a selected vertex and traversing a predetermined number of random edges of subsequent vertices yielding a subset of the vertices, the subset comprising the selected vertex and the subsequent vertices;

selectively adding vertices to the subset and removing vertices from the subset based at least in part on connectivity of the vertices to the subset yielding a proposed cluster; and evaluating whether the proposed cluster is acceptable as a cluster wherein fraction of internal connections which defines said cluster ($\beta$) is determined, a maximum fraction of connections by an outside object to said cluster ($\alpha$) is determined, and said cluster is defined as acceptable when the difference between said fraction of internal connections and said maximum fraction of connections by an outside object ($\beta-\alpha$) exceeds a threshold value.

12. The computer-usable storage medium of claim 11 further comprising modifying the proposed cluster by comparing connectedness of objects within the enlarged subset to connectedness of objects outside of the enlarged subset to objects within the enlarged subset.

13. The computer-usable storage medium of claim 11 wherein the performing a random walk comprises skewing selection of a subsequent vertex with probability proportional to a number of edges between previous vertices of the random walk and the subsequent vertex.

14. The computer-usable storage medium of claim 11 wherein the evaluating whether the proposed cluster is acceptable as a cluster is based at least in part on a minimum fraction of internal connections and a maximum fraction of external connections defining a cluster.

15. The computer-usable storage medium of claim 11 wherein the arbitrary undirected graph is a bipartite graph.

16. A system for identifying clusters of objects in an arbitrary undirected graph, the system comprising:

means for determining a subset of the objects by performing a random walk starting from a first object of the objects and following a plurality of random edges of subsequent objects, the subset comprising the first object and the subsequent objects;

means for determining an enlarged subset by enlarging the subset to include other objects well-connected to the subset; and means for determining whether the enlarged subset is a cluster wherein fraction of internal connections which defines a cluster ($\beta$) is determined, a maximum fraction of connections by an outside object to said cluster ($\alpha$) is determined, and said cluster is defined as acceptable when the difference between said fraction of internal connections and said maximum fraction of connections by an outside object ($\beta-\alpha$) exceeds a threshold value.

17. The system of claim 16 further comprising means for removing objects from the subset based on connectivity of objects within the subset.

18. The system of claim 16 further comprising means for modifying the enlarged subset by comparing connectedness of objects within the enlarged subset to connectedness of objects outside of the enlarged subset to objects within the enlarged subset.

19. The system of claim 16 further comprising skewing selection of the random edges of the random walk with probability proportional to a number of edges between previous objects of the random walk and a current object of the random walk.

20. The system of claim 16 wherein the means for determining whether the enlarged subset is a cluster is operable to determine whether the enlarged subset is a cluster based at least in part on a minimum fraction of internal connections and a maximum fraction of external connections defining a cluster.

* * * * *